US008473390B2

(12) United States Patent  
Joenk

(10) Patent No.: US 8,473,390 B2  
(45) Date of Patent: Jun. 25, 2013

(54) COMPUTERIZED METHOD AND SYSTEM FOR MANAGING A FINANCIAL PORTFOLIO RELATIVE TO MARKET VOLATILITY

(75) Inventor: Steven M. Joenk, Pleasantville, NY (US)

(73) Assignee: AXA Equitable Funds Management Group, LLC, New York, NY (US)

( * ) Notice: Subject to any disclaimer, the term of this patent is extended or adjusted under 35 U.S.C. 154(b) by 541 days.

(21) Appl. No.: 12/507,688

(22) Filed: Jul. 22, 2009

(65) Prior Publication Data

US 2011/0022539 A1 Jan. 27, 2011

(51) Int. Cl.
*G06Q 40/00* (2012.01)
(52) U.S. Cl.
USPC .............................................. 705/35; 705/41
(58) Field of Classification Search
USPC ...................................................... 705/41, 35
See application file for complete search history.

(56) References Cited

U.S. PATENT DOCUMENTS

| | | | | |
|---|---|---|---|---|
| 5,761,442 | A | * | 6/1998 | Barr et al. .................... 705/36 R |
| 2003/0088430 | A1 | * | 5/2003 | Ruark .............................. 705/1 |
| 2005/0262002 | A1 | * | 11/2005 | Manning et al. ................ 705/36 |
| 2010/0153300 | A1 | * | 6/2010 | Kolton et al. .............. 705/36 R |

OTHER PUBLICATIONS

Johnsen, Tommi; Nesbitt, Donald J. "A framework for factor return attribution"; Journal of Investing, 18, 2, 59(10), Summer, 2009; ISSN: 1068-0896.*

Abbes, Mouna Boujelbene; Boujelbene, Younes; Bouri, Abdelfettah; "Momentum Profits and Trading Costs"; E+M Ekonomie a Management, n2 pp: 73-88, 2008; Journal Code: EMEM.*

Hurn, Stan; Pavlov, Vlad, "Momentum in Australian Stock returns"; Australian Journal of Managment, v28n2, pp: 141-155, SEP 2003, ISSN: 0312-8962.*

* cited by examiner

*Primary Examiner* — Lalita M Hamilton
*Assistant Examiner* — Edward Chang
(74) *Attorney, Agent, or Firm* — K&L Gates LLP

(57) ABSTRACT

The system and method for managing a financial portfolio relative to market stability includes determining a first allocation of assets in the portfolio and a level of equity exposure, the portfolio including a plurality of funds; monitoring a quantitative risk indicator for market signals, determining whether the quantitative risk indicator meets a predetermined risk threshold value and if the risk indicator meets the risk threshold value, adjusting the level of equity exposure by selling a first position on a first set of options associated with a first fund and purchasing a second position on a second set of options associated with a second fund.

20 Claims, 11 Drawing Sheets

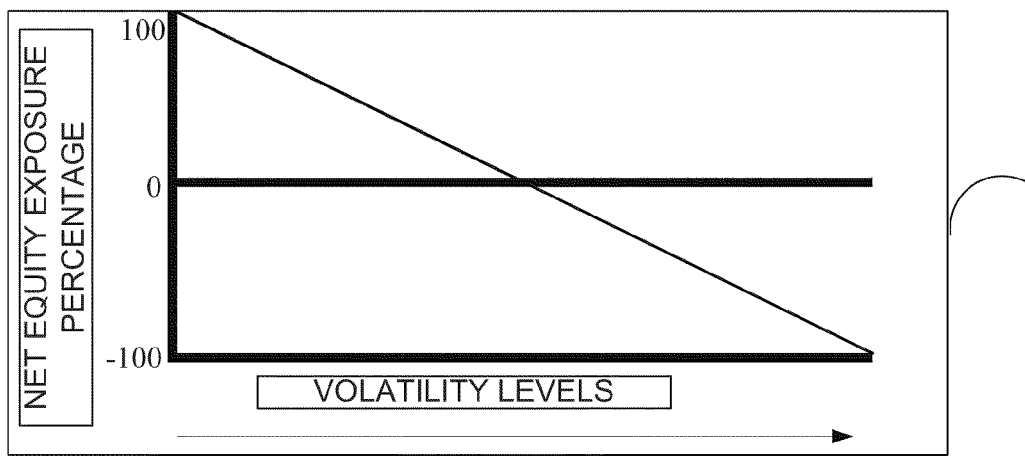
Fig. 7a
| MODEL BANDS | |
|---|---|
| RISK VALUE TRIGGER | NET EQUITY EXPOSURE |
| BELOW 20 | 100% |
| BELOW 22.5 | 87.5% |
| BELOW 25 | 75% |
| BELOW 27.5 | 62.5% |
| BELOW 30 | 50% |
| BELOW 32.5 | 37.5% |
| BELOW 35 | 25% |
| BELOW 37.5 | 12.5% |
| ABOVE 37.5 | 0% |
Fig. 7b
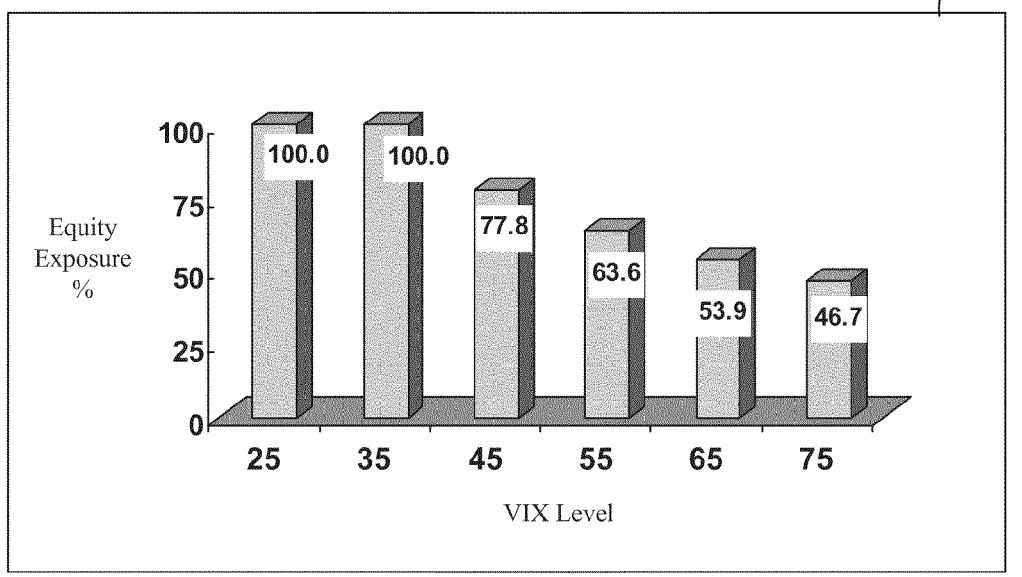
Fig. 7c

COMPUTERIZED METHOD AND SYSTEM FOR MANAGING A FINANCIAL PORTFOLIO RELATIVE TO MARKET VOLATILITY

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to computerized systems and methods that implement investment strategies and processes and use financial measurements to manage financial portfolios relative to market volatility. More specifically, the present systems and methods relate to a computer system and method implemented on machines connected to a network and using software for automatically adjusting the exposure of equity in a portfolio in response to changing market volatility data.

Market fluctuations create risk. While the extent of these fluctuations generally depends on the type of market, most markets will have periods where they are alternating between precipitous drops and record peaks. Considered broadly, fluctuations in the market can be predictable. But when considered with an increasing requirement for precision, they become unpredictable, regardless of what is being traded on the market. When fluctuations reach high levels, a market may be considered volatile. A typical asset manager may seek to exploit the volatility using any number of known techniques, but the number of market players exercising these techniques can increase the risk without magnification of the financial return. For example, if a portfolio is decreasing in value, the portfolio manager may seek to minimize risk by selling much of the portfolio's investments, thereby potentially causing the value of the underlying instruments to further decrease in value. Widespread activity of this kind can thus cause dramatic swings in the market for the instruments.

As such, there is a need to better manage portfolios and provide protection of long term investments through high fluctuations in portfolio values. There is a need to provide a computerized system and method for reducing the risk of assets in a portfolio regardless of how volatile markets become. There is also a need to manage one or more portfolios to manage risk, preferably without changing the position in the underlying assets themselves and thus without causing further market volatility.

SUMMARY OF THE INVENTION

The present invention provides computerized systems and methods that implement investment strategies and processes for managing a financial portfolio relative to market volatility. According to one embodiment, a computer implemented method and computer system for managing a financial portfolio relative to market volatility includes determining a first allocation of assets in the portfolio between a passively-managed index portion of the portfolio that consists of securities that comprise a securities market index, and a tactically-managed derivatives portion of the portfolio that may consist of futures contracts, options contracts and other derivatives that is used to adjust the level of equity exposure in the overall portfolio. The securities market index may be any market index such as S&P 500, S&P®400, the RUSSELL®2000, or any other large-cap market index, mid-cap market index, small-cap market index or international market index. The passively-managed index portion of the portfolio is generally managed to track the performance of a specific securities market index by holding all or a sampling of the securities in that index in the approximate percentage that each security represents in the index. The tactically-managed portfolio portion is generally managed, in accordance with the invention, by adjusting positions on the futures, options and other derivatives in that portion between long and short based on market volatility, where a fully long position seeks to track the corresponding index while a fully short position seeks to track the inverse of the corresponding index. There may be different versions of the portfolio, each with a passively-managed and tactically-managed portion based on a different index of securities. In some embodiments the allocation between the passively-managed portion of the portfolio and the tactically-managed portion is approximately 50%/50% of the total assets being invested.

In accordance with embodiments of the invention, the computer system monitors a quantitative risk indicator for market signals, the market signals including data transmissions to the computer system, to determine whether the quantitative risk indicator meets a predetermined risk threshold value by comparing data transmission values for the risk indicator with pre-stored threshold data values on a computer readable medium associated with the computer. If the risk indicator meets a stored risk threshold value, the computer system adjusts the level of equity exposure by changing a position on one or more derivatives instruments in the tactically-managed portion which are based on the passively-managed equities in the portfolio. For example, in periods of low volatility the portfolio will be fully equitized, with the tactically-managed portion being fully long on derivatives, while in periods of high volatility the portfolio will be de-equitized by the computer system changing the position on the derivatives to fully short. In some embodiments, the computer system changes positions in the tactically-managed portfolio portion between fully long and fully short based on a series of one or more trigger values being reached by the quantitative risk indicator.

In one embodiment, monitoring the quantitative risk indicator for market signals includes monitoring a volatility indicator that indicates volatility in a financial marketplace and monitoring a momentum factor associated with an equity exposure position. In addition, one embodiment includes recalculating the allocation of assets relative to a predetermined percentage of the associated level of equity exposure when adjusting the allocation of assets. According to another embodiment, it may include selling a position on a first futures contract and/or purchasing a position on a second futures contract. In addition, one embodiment includes selling a long position on the first futures contract and/or purchasing a short position on the second futures contract. In another embodiment adjusting the allocation includes selling a short position on the first futures contract and/or purchasing a long position on the second futures contract. Using this approach there is no need to sell the holdings in the passively-managed index portion of the portfolio.

In addition, the technique may include assigning a risk indicator trigger value, determining a volatility mode on the basis of a current risk indicator value relative to a risk indicator trigger value, determining a momentum mode on the basis of a current momentum indicator value relative to a momentum trigger value and implementing an equity exposure strategy based on the volatility mode and momentum mode.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 7a illustrates a graph plotting adjustments of equity exposure percentage in a fund by market volatility levels as managed by embodiments of the computerized methods and systems of the present invention;

FIG. 7b illustrates one embodiment of a table used in the computerized systems and methods of the present invention and representing risk value triggers and equity exposure levels;

FIG. 7c illustrates via a bar chart another set of risk value triggers and equity exposure levels used in the computerized systems and methods of the present invention to manage equity exposure in a fund based on market volatility levels in accordance with some embodiments of the invention;

DETAILED DESCRIPTION

In the following description, reference is made to the accompanying drawings that form a part hereof, and in which is shown by way of illustration specific embodiments in which the invention may be practiced. It is to be understood that other embodiments may be utilized and design changes may be made without departing from the scope of the present invention.

Figure 1:
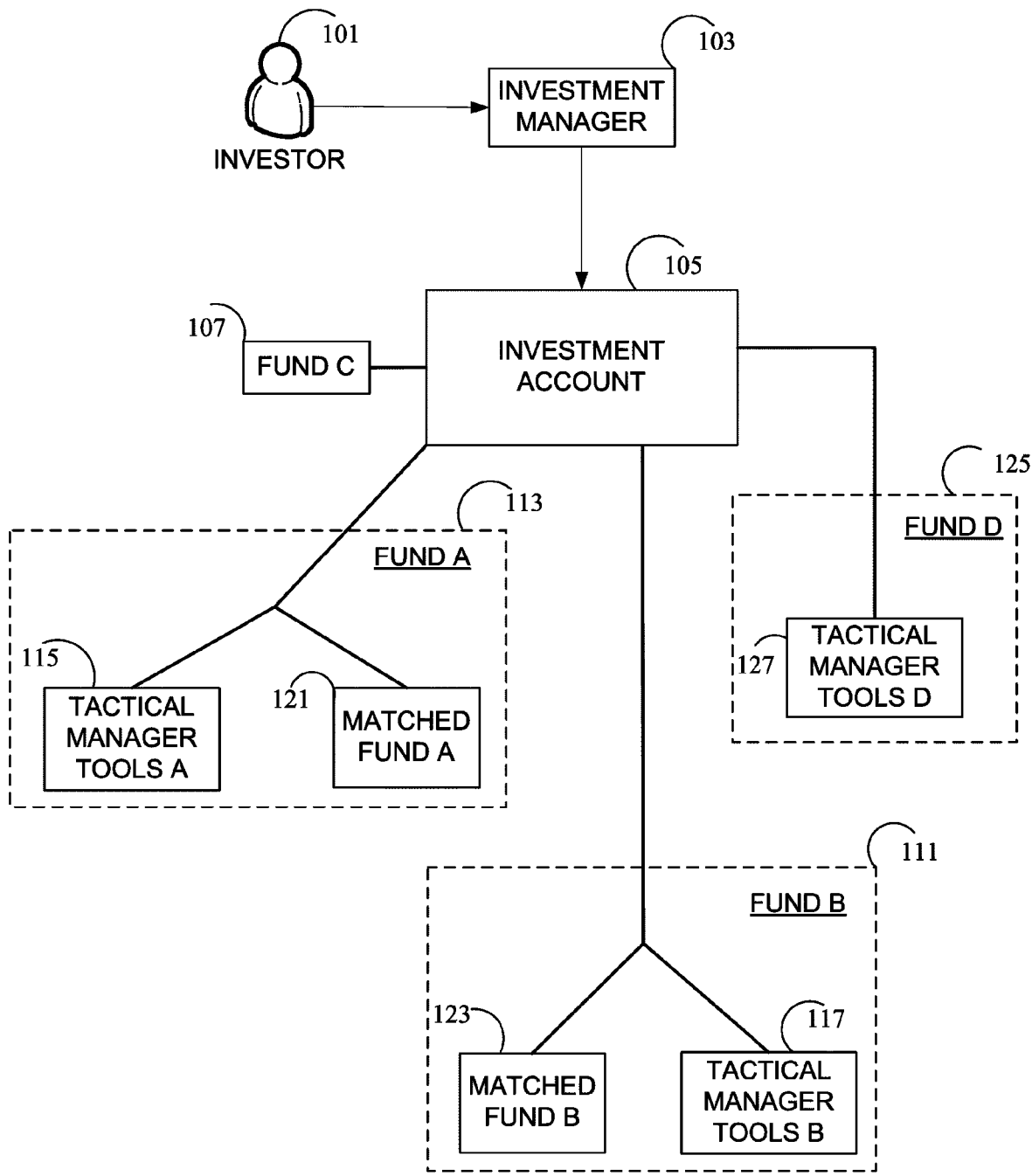
FIG. 1 illustrates a block diagram of one embodiment of a computer system for managing a financial portfolio relative to market volatility.

FIG. 1 illustrates a block diagram of one embodiment of a system for managing a financial portfolio relative to market volatility. The system of FIG. 1 includes an investor 101, an investment manager 103, an investment account 105, and a set of funds or portfolios associated with the account 105 including Fund A 113, Fund B 111, Fund C 107 and Fund D 125. As used herein, a fund may consist of a single fund or a set or portfolio of multiple funds. The system of FIG. 1 includes tool sets for managing the financial portfolio of funds relative to market volatility, the tool sets including Matched Fund A 121 and associated Tactical Manager Tools A 115; Matched Fund B 123 and associated Tactical Manager Tools B 117; and Fund D 125 and associated Tactical Manager Tools D 127. The makeup and function of these various components are described in detail below.

In one embodiment, the set of funds may represent the availability of different financial instruments from which the investor may choose to contribute into. For example, the set of funds may be defined by the specific set of securities in which they will invest, e.g. a specific set of securities associated with companies in the S&P® 500, S&P®400, the RUSSELL®2000, or similar market index; a set of securities consisting of securities associated with companies in the S&P® 500, S&P®400, the RUSSELL®2000, or similar market index and a set of derivative securities relating to the specific set securities; securities issued by other funds; securities issued by exchange-traded funds (or "ETFs") or a set of index based securities relating to the specific set of securities, etc.

As illustrated in FIG. 1, the funds underlying the account 105 may include market index funds only, tactically-managed funds matched with Tactical Manager Tools, or just the Tactical Manager Tools. For example, Fund C 107 represents an investment in equities such as a market index, without use of any Tactical Manager Tools according to the present invention. Fund A 113 contains Matched Fund A, which consists of investments in equities, and investments in the associated Tactical Manager Tools A 115 which comprise investments in equities in a market index and investments in derivative as managed by a computer system based on market volatility as described further below. Similarly, Fund B 111 contains Matched Fund B and associated Tactical Manager Tools B 117. Fund D 124 comprises only Tactical Manager Tools D 127, a tactical fund managed by a computer system as described herein. Tactical Manager Tools A 115, Tactical Manager Tools B 117, and Tactical Manager Tools D may include investments in a set of equities that comprise a market index and a set of derivative instruments, such as, futures and/or options contracts relating to the underlying investments in the corresponding Matched Funds 113, 111 and 125, respectively.

Each set of Tactical Manager Tools use stored triggers for adjusting the equity exposure of the portfolios associated with the set of funds. In one embodiment, a portfolio associated with the set of funds may be defined by a different set of securities and may include other distinguishing criteria for determining an optimized weight and appropriate trigger value associated with the tactical manager tools. For example, a trigger value may include a calculation involving a publicly available volatility measurement corresponding to the set of underlying securities in the fund's portfolio.

In accordance with some embodiments of the invention, a Tactical Manager Fund utilizes an investment strategy that combines a passive investment index style focused on equity securities of mid-capitalization companies with atactically managed futures and options strategy that will be used to tactically manage equity exposure to such companies based on the level of volatility in the market, as described herein.

For example, portfolio Fund A 113 may generally invest approximately 50% of its net assets in the securities of companies included in the S&P MidCap 400 Index in a manner that is intended to track the performance (before fees and expenses) of that index. Similarly, Fund B 111 may generally invest approximately 50% of its net assets in the securities of companies included in the S&P 500 Index in a manner that is intended to track the performance (before fees and expenses) of that index. These percentages may deviate by up to 30% of the portfolio's net assets. The portfolios also may invest, to a limited extent, in equity securities of companies that are not included in their respective indexes.

In accordance with embodiments of the present invention, the remaining portion of each of the assets of portfolio Funds A and B may invest in, as part of the respective Tactical Manager Tools, futures, index options, exchange-traded and over-the-counter options, options on futures and options on ETF based on, for Fund A, the S&P 400 Index, for Fund B, the S&P 500 Index, or other indices or combinations of indices representative of the market for equity securities of mid-capitalization companies. In accordance with aspects of the invention as described in greater detail below, the futures and options portion of each fund is used to manage overall equity exposure. Futures and options can provide exposure to the performance of an index without buying the underlying securities comprising the index. They also provide a means to manage overall exposure to the index without having to buy or sell the underlying securities that comprise the index. The use of options also permits a fund to diversify its investments and seek performance enhancement, while putting at risk only the premium paid for the option. Each fund also may invest in ETFs.

During normal market conditions, it is expected that each Tactical Manager Fund will invest substantially all of its assets in long positions on the respective equity index, e.g., the S&P 400 Index for Fund A. When market volatility is increasing above specific thresholds set for the individual funds, the fund may limit its exposure to the respective index, e.g., the S&P 400 Index for Fund A, by reducing its investment in the securities that comprise the index, selling its long futures and options positions on the index, increasing cash levels and/or shorting the index. A fund may achieve short exposure using a variety of techniques, including the purchase of options (including options on futures contracts) and short sales. When the models indicate that market volatility is decreasing below the thresholds set for the individual fund, the fund may increase its exposure to the respective index, e.g., the S&P 400 Index for Fund A, through investments in securities comprising the index and through the purchase of futures and options on the index, while maintaining minimum cash levels.

The level of each fund's exposure to the respective index in the Matched Fund, e.g., the S&P 400 Index for Fund A, generally is determined based on an assessment of market fundamentals and quantitative signals of market movement, including the level of volatility in the market as measured, in one embodiment, by the Chicago Board Options Exchange Volatility Index (the "VIX Index") or another quantitative indicator of market volatility. As known to those of skill in the art, the VIX Index measures market expectations of near-term volatility based on S&P 500 Index option prices. In accordance with some embodiments, each fund will decrease or increase its exposure to its respective index based on predetermined thresholds of market volatility as measured by the VIX Index. These thresholds are different for each fund and may be changed from time to time. During periods of extremely high market volatility, it is possible that a fund could have zero or negative exposure to its respective index. During periods of unusually low market volatility, it is possible that a fund could have 100% or more exposure to its respective index. This investment strategy is intended to reduce the overall risk of investing in the equity securities of companies represented in the index, but may result in a fund underperforming that index during certain periods. Each fund may engage in active and frequent trading of portfolio securities to achieve its investment objective.

In some embodiments, some or all of the funds managed by the computer system are non-diversified portfolios (such as those defined in the Investment Company Act of 1940, as amended), which means each may invest in a limited number of issuers. A fund may be considered to be non-diversified primarily because it may invest a significant portion of its assets in options and futures contracts, the issuers of which could be deemed to be the exchanges on which the options or futures contracts are traded. The funds may be diversified for federal income tax purposes so that they can qualify as a regulated investment company. As a defensive measure in response to adverse conditions and for cash management purposes, the funds also may invest in cash and U.S. government securities, money market instruments and prime quality cash equivalents.

In accordance with aspects of the invention, a Tactical Manager Tool may be offered to investors as a direct investment option. Thus, Fund D in FIG. 1 consists of Tactical Manager Fund D but has no associated Matched Fund offered to investors for investment. For example, Tactical Manager Fund D may invest in securities based on the Russell 2000 as well as futures, index options, exchange-traded and over-the-counter options, options on futures and options on ETFs based on the Russell 2000 or other indices or combinations of indices representative of the market for equity securities of mid-capitalization companies. The investments in Tactical Manager Tools D are managed the same way in which the investment in the Tactical Manager Tools matched with equity funds are managed, as described above with reference to Funds A and B, and further below.

Figure 2:
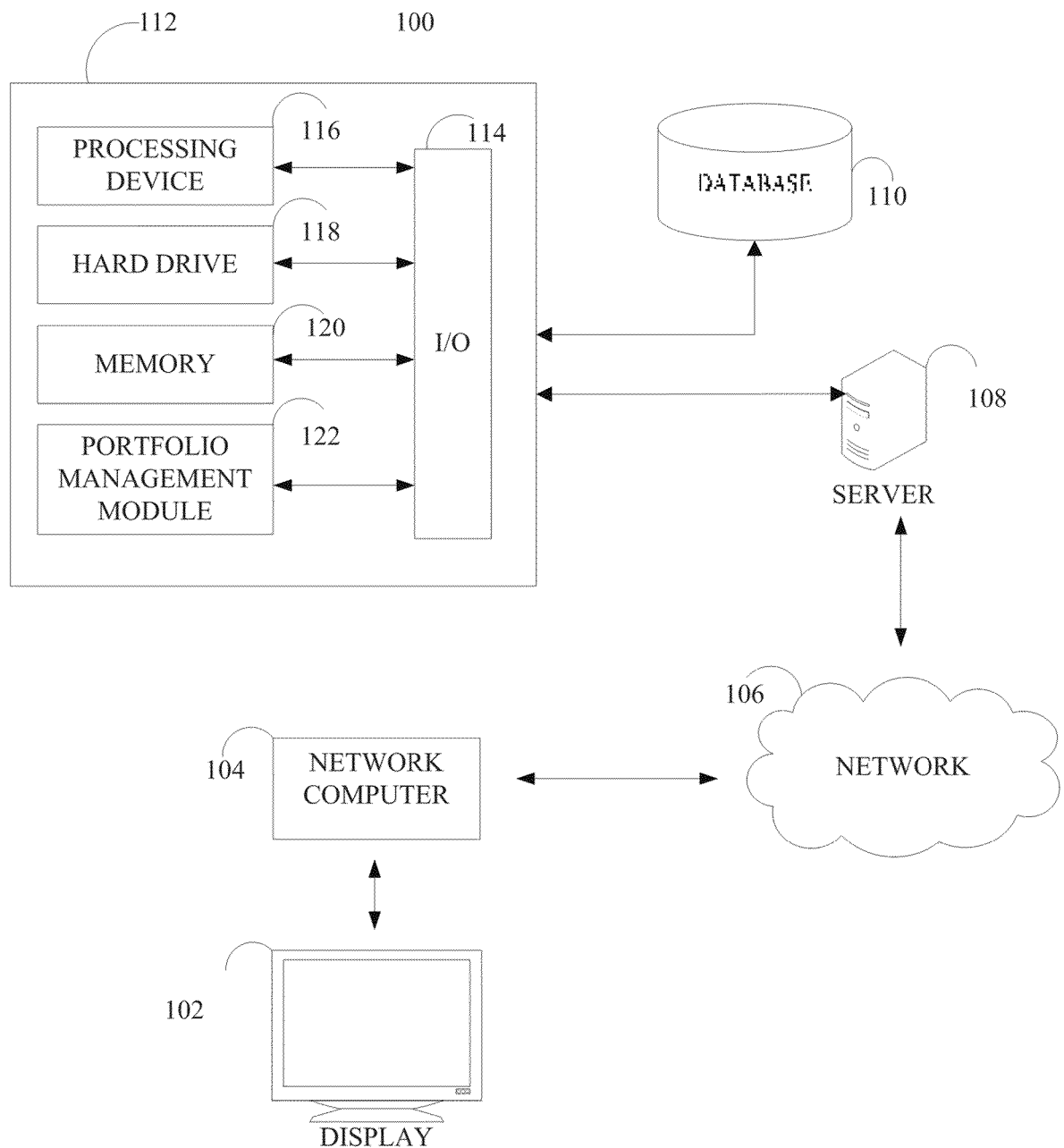
FIG. 2 illustrates a block diagram for one embodiment of a computer system and network configuration which may be used for managing a financial portfolio relative to market volatility.

In accordance with the invention, the financial portfolios and tactical manager tools of the present invention are implemented, administered and managed through use of a computer system and network. FIG. 2 illustrates a block diagram of one embodiment of a computerized system 100 for managing the financial portfolios including a display 102, a network computer 104, a network 106, a server 108, a database 110 and a set of computer components 112. The computer components may include an input/output device; a processing device 116, a hard drive 118, a memory structure 120 and a portfolio management module 122. The system 100 may be implemented on a single computer system, such as the server 108, or on a plurality of computer systems (not shown) on a network 106.

The display 102 may be any suitable type of device, generally a combination of hardware and software, operative to receive and display information from the network computer 104 or from a device on the network 106. As illustrated, the display 102 is in operative communication with the network computer 104. The display 102 may also include a computer readable medium or other memory for receiving and analyzing a live feed, for example, a stock ticker. In one embodiment, the display 102 may be a computer monitor providing display via the network computer 102 engaged to the server 108 via the first network 106. For example, a client side application running on the network computer 104 may receive data from a server-side portfolio management module 122 for presentation to a user on the display 102.

The network computer 104 may be any suitable type of device, generally a combination of hardware and software, operable to be in communication with the display 102 and the network 106. The network computer 104 may include a general-purpose computer comprising a processor or processing device with associated computer readable medium/memory, as recognized by one skilled in the art. The network computer 104 may also include architecture for a plurality of input/output subsystems, at least one network adapter and bus to provide a communications path between components comprising the general purpose computer.

In one embodiment, the network computer 104 may be a personal computer or a server computer 108 of the type commonly employed in networking environments. The network computer 104 may be used by a user to accumulate, analyze, and download financial data, or may be used to manage a plurality of financial agents to implement or facilitate the implementation of a system for managing risk in a financial portfolio. For example, the network computer 104 may periodically receive data from each of the plurality of financial agents over the network 106, indicating status, predictions and prospective movements of market signals.

A user, for example, a portfolio manager, fund manager, or other entity may use the network computer 104 to access and view information served from the network 106. For example, as a client/server model, the user may access and view information from one or more servers or databases that may be utilized to store any of the information described herein and to serve the information to a network computer 104 acting as the client.

In one embodiment, the network computer 104 or any networked device includes an interface to a portfolio management module 122 and financial records system (not shown). The portfolio management module 122 and financial records may be stored locally on the network computer or on the server 108. For example, the network computer 104 may be connected to a portfolio management module 122, financial records system or any other type of distributed system that may be used to implement or facilitate the implementation of a system for managing risk in a financial portfolio.

The network 106 utilizes any number of a wide variety of known techniques for the transfer of electronic data thereacross. For example, the network 106 may comprise an IP based network, dedicated access lines, plain ordinary telephone lines, satellite links, combinations of these, etc. Additionally, the network 106 may include a plurality of network computers or server computers (not shown), each of which may be operatively interconnected in a known manner. Where the network 106 comprises the Internet, data communication may take place over the network 106 via an Internet communication protocol, for example TCP/IP. In one embodiment, known encryption techniques and secure shell connections may be used to protect sensitive transmissions of data over the network 106.

The server 108 may comprise a computer or processing device on a network that manages network resources. As illustrated in FIG. 2, the server 108 may include an input/output device 114 which may be in operable communication with a processing device 116, hard drive 118, a memory 120 and a portfolio management module 122. According to one embodiment, the server 108 may include any number of servers such as an application server, an audio/video server, a database server, a fax server, a file server, an Intranet server, a mail server, a network access server, a proxy server, a remote access server, a telephony server or a web server. The server 108, network computer 104 and database 110 may all be in operable communication connected with bridging technologies such as Ethernet, a modem, a router and various network adapters. The server 108 may also comprise a web server hosting a website or web application. As with other server embodiments, a user may login to the web server and navigate to a specific or customized interface.

The processing device 116 may include one or more processors or CPU having an ALU, memory registers and input/output hardware architecture, as recognized by one skilled in the art. For example, a processor may include an instruction set. In one embodiment, the server 108 may include a plurality of processing devices running in parallel. The hard drive 118 and memory 120 may include any number of transient and persistent storage devices, such as a computer readable medium, Random Access Memory (RAM), cache memory or other computer memory.

In one embodiment, the portfolio management module 122 reserves a portion of a computer readable medium to implement one or more methods for managing a financial portfolio. The portfolio management 122 module may also include a plurality of customized modules to handle one or more operations from a set of users, such as, for example, investors, financial advisors, fund managers, portfolio managers, financial brokers and traders, as described in further detail below.

The database 110 may be in operative communication with the server 108 through the computer components 112 as well as the network computer 104 or any networked device. In addition, the database may include a plurality of databases geographically distributed across the network 106.

The system 100 provides for the management of financial investments, wherein the management includes the management of risk associated with market volatility. The portfolio management module 122 may execute processing instructions for managing the financial investments. For the sake of brevity, the management of financial assets is described relative to the method steps in the flowchart of FIG. 4 and FIG. 5.

Figure 3:
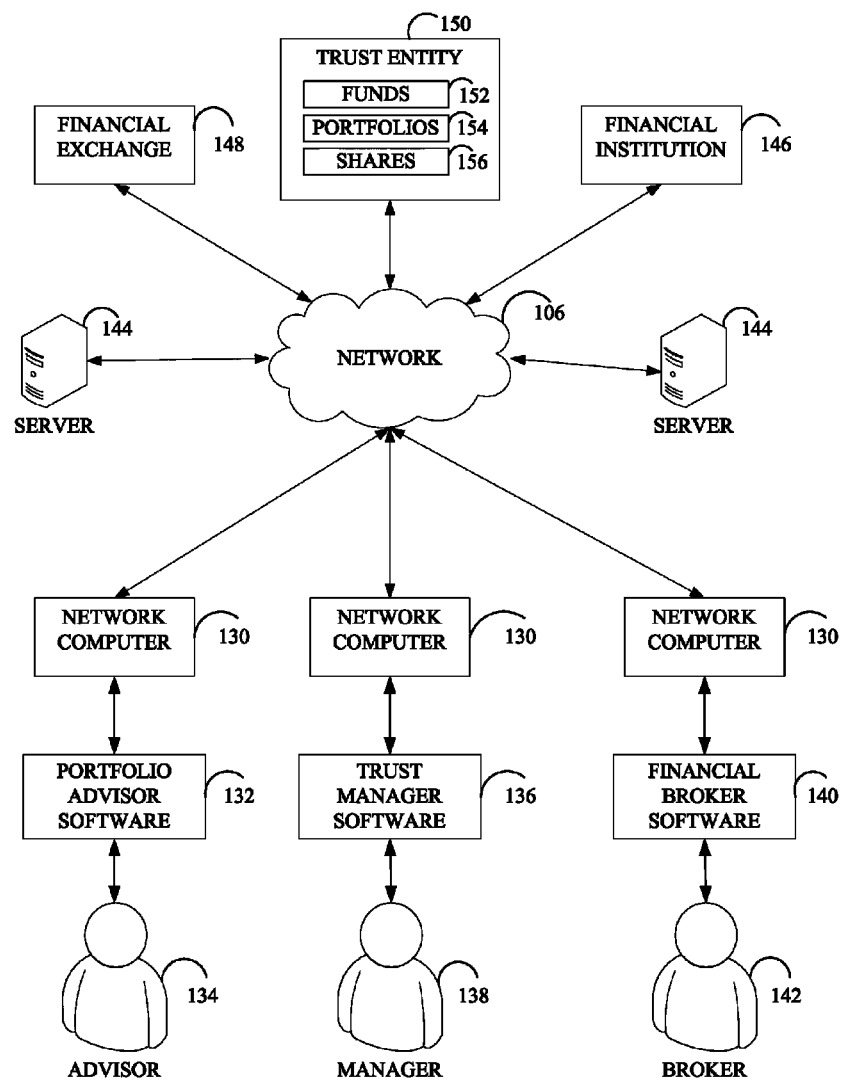
FIG. 3 illustrates a block diagram of one embodiment of the computer system and network of FIG. 2 being used in managing a financial portfolio relative to market volatility.

While FIG. 2 illustrates the management system 100 in a single network computer 104 environment, FIG. 3 illustrates a block diagram of a multi-computing system for managing a financial portfolio relative to market stability. The system of FIG. 3 includes a network 106, a plurality of servers 108, a plurality of network computers 130, a plurality of software (e.g., software code, applications, programs, APIs, etc.), such as portfolio advisor software 132 accessible by an advisor 134, trust manager software 136 accessible by a trust manager 138, and financial broker software 140 accessible by a broker 142. The advisor 134, manager 138 and broker 142 may include other types of users having additional roles.

FIG. 3 additionally illustrates a trust entity 150 including: a set of funds 152, a set of portfolios 154 and a set of shares 156, as well as, a financial institution 146 and a financial exchange 148. The trust entity 150, the financial institution 146 and the financial exchange 148 may include other entities engaged in the control and/or management of funds.

As shown in FIG. 3, the network 106 may be operatively connected to a plurality of network computers 130, placing the users 134, 138 and 142 in communication with at least one of the plurality of servers 144 or with any of the entities 146, 148 and 150. The distributed configuration illustrated in FIG. 3 may provide several advantages, such as enabling real time monitoring of market signals and real time execution of market orders, for example the buying or selling financial instruments, as well as the periodic or scheduled monitoring of market signals and execution of market orders.

The plurality of software 132, 136, 140 may be installed on any of the plurality of network computers 130 or as a set of server-side applications on any of the plurality of servers 144. The users and entities may be located, by way of example, in separate geographic locations. In one embodiment, access to the plurality of software 132, 136, 140 may be restricted or require authentication before sending an instruction, for example, a market transaction, to another node on the network 106. Generally, the users and entities may represent other users and entities that may be involved in managing risk in a financial portfolio. For example, the plurality of users and entities may represent investors, financial advisors and investment companies. The plurality of users 134, 138 and 142 may communicate with the plurality of entities 146, 148 and 150 over the network 106 via a network computer 130 by using the appropriate software. In addition, the plurality of entities 146, 148 and 150 may be in operable communication with each other via known networking techniques.

The trust entity 150 is any entity responsible for the administration of assets on behalf of another. For example, the trust entity 150 may be responsible for the administration of assets on behalf of an institution, corporate entity, firm, or one or more individuals. In one embodiment, the trust entity 150 may be any registered, open-end management investment company with the authority to issue securities (e.g. the set of shares). In addition, the trust entity 150 may be a state recognized statutory trust registered with the Securities and Exchange Commission (SEC) as an investment company. In one embodiment, the manager 138 may be a trust manager responsible for all or some of the funds and shares administered by the trust entity 150.

In one embodiment, an insurance company may sell an annuity to an investor that offers the funds and shares of the trust entity 150 as underlying investment options. In general, an annuity goes through two phases including an accumulation phase and a distribution phase. During the accumulation phase, the investor deposits money into a separate account sponsored by the insurance company, accumulates the deposited money into a separate account or set of sub-accounts and invests the deposited money in funds that are part of the trust entity 150. During the distribution phase, the insurance company makes income payments for a specified period of time, generally until death of the investor. To finance the stream of payments during the distribution phase, investors invest their deposited money into one or more of the funds that are part of the trust entity 150.

The trust entity 150 may then appoint a manager 138 to oversee an advisor 134 to handle the day-to-day investment of the assets in a given fund or portfolio. In one embodiment, the manager 138 may monitor the advisor 134 to evaluate the advisor's performance, significant changes that may impact the advisor's overall business, the advisor's operations and changes in investment personnel and senior management.

The trust entity 150 also may then appoint a manager 138 to handle directly the day-to-day investment of the assets in a given fund. In one embodiment, the manager 138 is responsible for determining the asset allocation range for the fund and selecting the investments that will be held by the fund.

The manager 138 may be one or more individuals or entities responsible for the assets held by the trust entity 150. In one embodiment, the manager 138 may be responsible for general management and administration of trust assets including determining the allocation of assets in a fund, overseeing the models used to manage the funds, selecting and monitoring an advisor 134 and ensuring the asset allocations are consistent with the guidelines approved by a board of trustees. The manager 138 may also play an active role in monitoring each fund and adviser 134 and may use the trust manager software 136 to generate analytics for evaluating a fund's performance, style, risk levels, diversification and other criteria. In addition, the manager 138, through the trust manager software 136, may continuously monitor the operations and changes of an advisor 134. For example, where an advisor 134 is an asset management firm, the manager 138 may monitor changes in personnel and senior management, conduct an advisor review and perform other types of due diligence.

In one embodiment, the manager 138 may request the advisor 134 to generate a report or alert at the occurrence of a predetermined event. In addition, the manager 138 may have discretion to allocate the assets in the plurality of funds 154 among a set of advisors. The broker 142 may be a broker registered with the SEC and responsible for the sale or distribution of the set of shares. In one embodiment, a fund may include one or more classes of shares. Both classes of shares may be offered and redeemed at net asset value without a sales load. The set of shares 156 may include a set of redeemable shares of the funds of trust entity 150. The transfer of such shares may be open or restricted. In one embodiment, the shares are restricted to certain affiliate accounts, funds (e.g. 401(k) plans) or selected investment and insurance companies. In one embodiment, the trust entity 150 may only sell shares to (i) insurance company separate accounts in connection with variable life insurance contracts and variable annuity certificates and contracts issued by one or more affiliated or unaffiliated insurance companies; (ii) a specified 401(k) plan or (iii) other series of the trust entity 150 and a separate registered investment company managed by the manager 138 that currently sells its shares to such accounts and plans.

The set of funds 154 may include diversified and non-diversified funds, and may include funds with different sets of investment objectives, investment strategies and investment risks. In general, a portfolio is a mix or collection of investments held by institutions or a private individual. For example, a given portfolio may include one or more funds in the set of funds 152 that are part of the trust entity 150. In one embodiment, the advisor 134 provides the day-to-day management of one or more funds in the plurality of funds 154. As mentioned above, the manager 138 may monitor the advisor's compliance with the investment guidelines and strategy set by the trust entity 150. For example, one risk management strategy may tactically reduce equity weightings in a set of funds during periods of high volatility as measured by a blind risk indicator (e.g. a volatility index).

The set of funds 152 may include a set of distinct mutual funds, each with its own investment strategy and risk/reward profile. In general, funds may be used to pool money from many investors and invest it in stocks, bonds, derivatives, short-term money market instruments, and/or other securities. In one embodiment, the set of funds may be considered the set of tactical manager funds for allocating assets to a securities market index, a set of options, a position on futures contracts, derivative securities, cash collateral or substantially similar securities. In managing the risk of a fund, the investment guidelines may, in some embodiments, restrict the advisor 134 from transferring assets at will. For example, the advisor 134 may be restricted from modifying the investment in the securities market index regardless of changes in the market or economy. Instead, the advisor 134 may purchase or sell futures positions and options on futures positions to obtain maximum equitization or neutralization of equity in the fund or an intermediate equity exposure.

The financial institution 146 is an institution that provides financial services for its clients or members. The financial institution may include a deposit-based institution that manages deposits and provides loans (e.g. banks, credit unions, and mortgage companies), an insurance company, or an investment company. In one embodiment, the trust entity 150 may be sponsored by any type of financial institution.

The financial exchange 148 may include any organization, association, or group of persons, whether incorporated or unincorporated, which constitutes, maintains, or provides a market place or facilities for bringing together purchasers and sellers of securities or for otherwise performing with respect to securities the functions commonly performed by a stock exchange as that term is generally understood, and includes the market place and the market facilities maintained by such exchange.

Exchanges may be further understood by the instruments traded on the exchange market. For example, a stock market exchange sells stock, securities or shares associated with a company. A commodities exchanges trades commodities, such as, for example, basic resources and agricultural products such as iron ore, crude oil, coal, ethanol, salt, sugar, coffee beans, soybeans, aluminum, rice, wheat, minerals, etc. A foreign exchange market may trade currency, stock, or other security of a foreign country. A financial exchange 148 may also be understood by the type of trades. For example, a classical exchange supports trading of the actual securities. A futures exchange or futures and options exchange supports trading for derivatives, otherwise known as a futures contract.

For example, an option is a contract between a buyer and a seller that gives the buyer the right—but not the obligation—to buy or to sell a particular asset (the underlying asset) at a later day at an agreed price. In return for granting the option, the seller collects a payment (the premium) from the buyer. A call option gives the buyer the right to buy the underlying asset; a put option gives the buyer of the option the right to sell the underlying asset. If the buyer chooses to exercise this right, the seller is obliged to sell or buy the asset at the agreed price. The buyer may choose not to exercise the right and let it expire. The underlying asset can be a piece of property, or shares of stock or some other security, such as, among others, a futures contract. For example, buying a call option provides the right to buy a specified quantity of a security at a set agreed amount, known as the 'strike price' at some time on or before expiration, while buying a put option provides the right to sell. Upon the option holder's choice to exercise the option, the party who sold, or wrote the option, must fulfill the terms of the contract the right to buy or sell specific quantities of a financial instrument at a specified price with delivery set at a specified time in the future.

In one example, the underlying asset may be the corresponding futures contract that is purchased or sold upon the exercise of the option. For example, an option on a June Chicago Mercantile Exchange (CME) Live Cattle futures contract is the right to buy or sell one such contract. An option on September CME Canadian dollar futures gives the right to buy or sell one September CME Canadian dollar futures contract.

The premium is the price that the buyer of an option pays and the seller of an option receives for the rights conveyed by an option. Thus, ultimately the cost of an option is determined by supply and demand. Various factors affect options premiums, including strike price level in relation to the futures price level; time remaining to expiration; and market volatility.

Volatility is a function of price movement. When prices are rising or falling substantially, volatility is said to be high. When a futures contract shows little price movement, volatility is said to be low. High volatility generally causes options premiums to increase—sometimes very dramatically. Lower volatility environments generally cause options premiums to decline. This is because when markets become volatile, option buyers are willing to pay larger premiums for greater protection against adverse price risk because there is greater chance of price change in the underlying instrument.

On the other hand, a greater chance for price change means more risk for the option seller. Sellers therefore demand a larger premium in exchange for this risk. It is much the same as insurance and insurance underwriters. If risk is perceived to be large, the insurance company will require a larger premium. If the risk is not large, the insurance purchaser will not have to pay a large premium. With options, anytime there is a greater chance of the underlying futures advancing or declining through one or more exercise prices, risk is perceived to be greater and premiums will increase.

Figure 4:
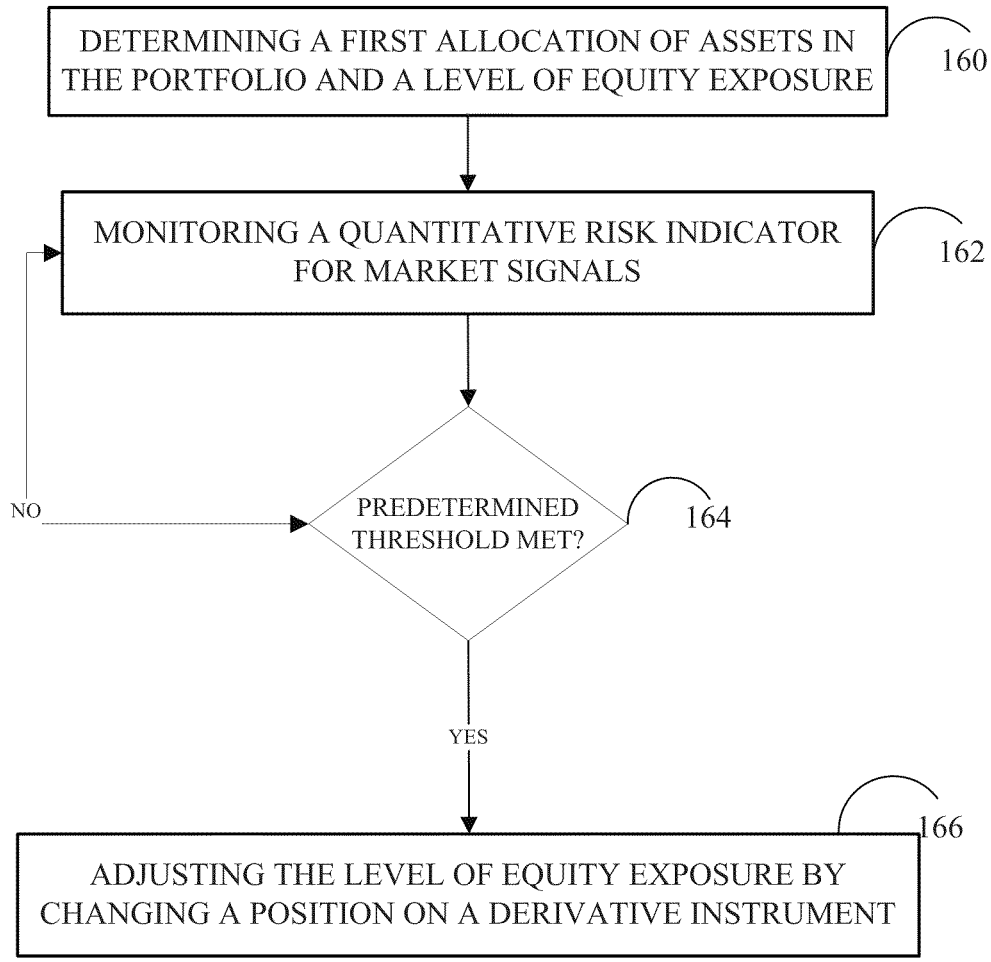
FIG. 4 illustrates a flow diagram for the steps of a method for managing a financial portfolio relative to market volatility in accordance with one embodiment of the present invention.

For the sake of brevity, the operations of the system of FIG. 3 may also be described relative to the flowchart of FIG. 4.

FIG. 4 illustrates a flow diagram for the steps of a method for managing a financial portfolio relative to market volatility. In one embodiment, the processing operations of the steps of this method may be performed by one or more processing devices, such as the within the server 144 or the computers 130. For example, the methodology steps may be incorporated in the executable instructions of the trust manager software 136.

The method includes step 160, determining a first allocation of assets in the fund and a level of equity exposure. In one embodiment, and as described above with reference to FIG. 1, each fund may utilize an investment strategy that combines a passive investment index style focused on equity securities, with a tactically managed futures and options strategy that can be used to tactically manage equity exposure to such companies based on the level of volatility in the market. Each fund may generally invest approximately 50% of its net assets in the securities of companies included in one or more specified securities market indices in a manner that is intended to track the performance (before fees and expenses) of that index. Some examples of a securities market index include the S&P 500, the S&P 400, the Russell Index, the NASDAQ Composite Index, the NASDAQ 100 Index, the NYSE Composite Index, the Hang Seng Index in Hong Kong and the IBEX 35 Index. The remaining portion of each fund's assets may be allocated to futures, index options, exchange-traded and over-the-counter options, options on futures and options on ETFs based on the specified securities market index or other indices or combinations of indices representative of the market for equity securities companies, as described above with reference to FIG. 1.

With respect to FIG. 2, this step may be performed by the portfolio management module 122. With respect to FIG. 3, this step may include the network computer 130 of the manager 138 accessing the investment data from the trust entity 150.

The next step, step 162 includes monitoring a quantitative risk indicator for market signals. In one embodiment, a quantitative risk indicator may include a volatility index, for example, the risk indicator may be a market risk indicator, such as the VIX Index. During normal market conditions, it is expected that each fund will invest substantially all of its assets in long positions on the specified market securities index. Again, this step may be performed by the management module 122 of FIG. 2, and can be performed by the trust manager software 136 and may also include operations performed by the portfolio advisor software 132 where appropriate, as recognized by one skilled in the art.

Step 164 is the determination of whether the quantitative risk indicator meets a predetermined risk threshold value. The threshold value may be determined by analyzing a set of empirical data regarding fluctuations in a specific index or market. For example, a volatility index measurement may be retrieved from the financial exchange 148 and analyzed by the trust manager software 136, the portfolio advisor software 132 or, in one embodiment, based on the operations of step 166 below, may be in-part performed by the financial broker software 140.

If the risk indicator meets the risk threshold value, the method performs step 166, adjusting the level of equity exposure by changing a position on a derivative instrument. For example, a fund will sell a futures contract and purchase an option on a futures contract in order to reduce equity exposure, and sell an option on a futures contract and purchase a futures contract to increase equity exposure. When the quantitative risk indicator signals that market volatility is increasing above specific predetermined thresholds set for a given fund, the fund may limit its exposure to the specified market securities index either by reducing its investment in the securities that comprise the index, selling its long futures and options positions on the index, increasing cash levels and/or shorting the index. In that regard, the broker 142 may then engage in performing trading operations on the futures contracts to actively manage the volatility risk.

In one embodiment, the fund may achieve short exposure using a variety of techniques, including the purchase of options (including options on futures contracts) and short sales. When the quantitative risk indicator signals that market volatility is decreasing below the thresholds set for the individual fund, the fund may increase its exposure to the specified market securities index through investments in securities comprising the index and through the purchase of futures and options on the index, while maintaining minimum cash levels. Thereupon, in this embodiment, the method of FIG. 4 is complete.

Figure 5:
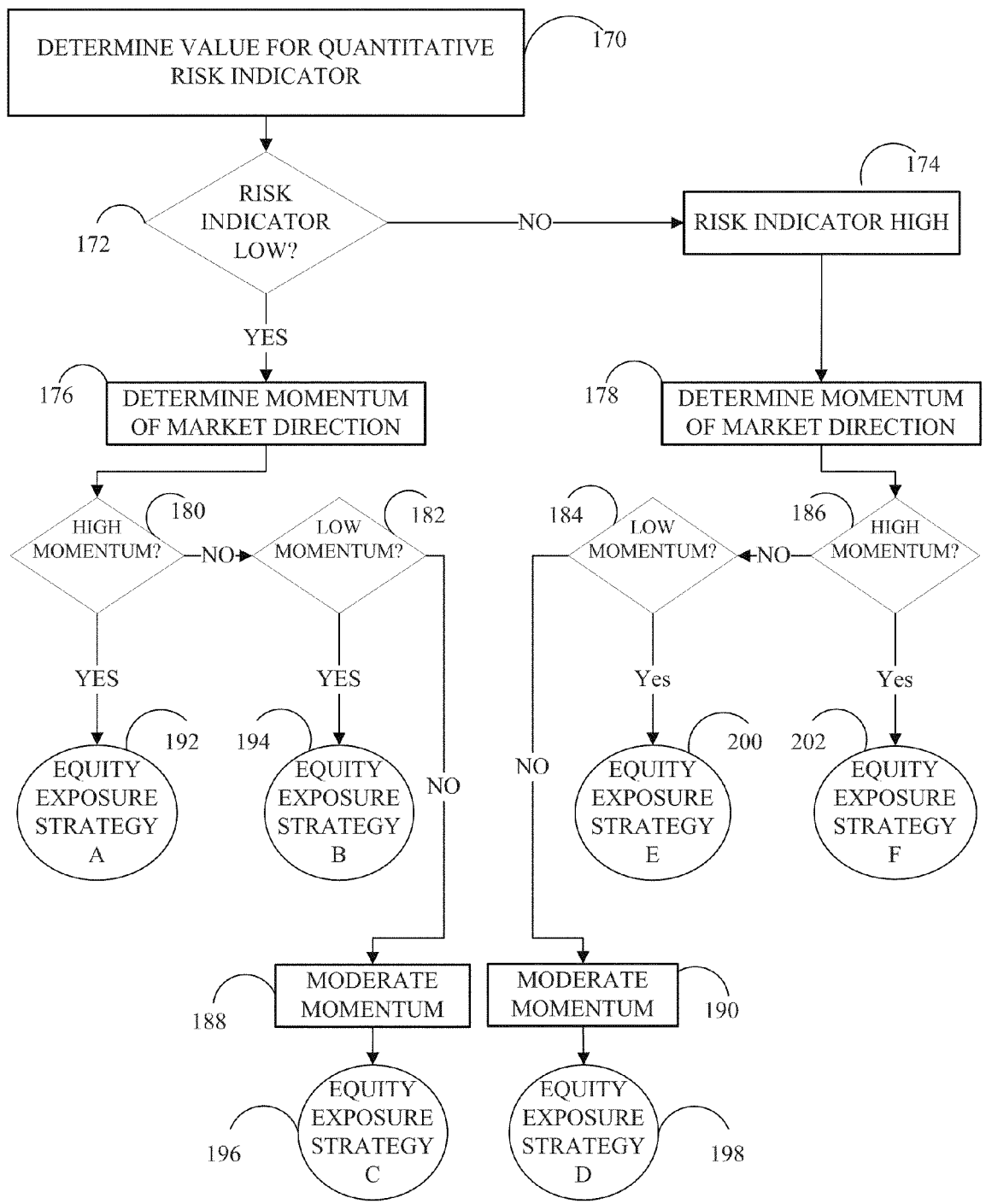
FIG. 5 illustrates a flow diagram of another embodiment of the method for managing a financial portfolio relative to market volatility in accordance with the present invention.

FIG. 5 illustrates a flow diagram of another embodiment of the method for managing a financial portfolio relative to market volatility. Step 170 includes determining the value for a quantitative risk indicator, similar to step 162 of FIG. 4. If the risk indicator value indicates low risk, for example, low volatility, the next step, step 176 is determining the momentum of the low risk, or low volatility. If the risk indicator does not indicate low risk, then the risk is high or, for example, the value of the quantitative risk indicator signals high volatility, step 174. Whether the risk indicator is low or high, the next step is determining momentum, either step 176 or 178 based on the inquiry of step 172.

Momentum may be a measurement of the historical empirical distribution of the changes in securities market index. In one embodiment, momentum has 3 regimes or modes: high; low and moderate. For example, high momentum includes a momentum value above the 70th percentile (greater than 17% of the trailing 12 month return for the securities market index). In addition, low momentum may be a momentum value below the 30th percentile (less than 3% of the trailing 12 month return for the securities market index). Moderate momentum may be a momentum value between the 30th and 70th percentile or (between 3% and 17% of the trailing 12 month return for the securities market index). In one embodiment, the determination of a momentum value may occur in real time. In another embodiment, the determination of a momentum value may be by a scheduled estimate, for example, daily, weekly monthly or yearly.

Figure 8A:
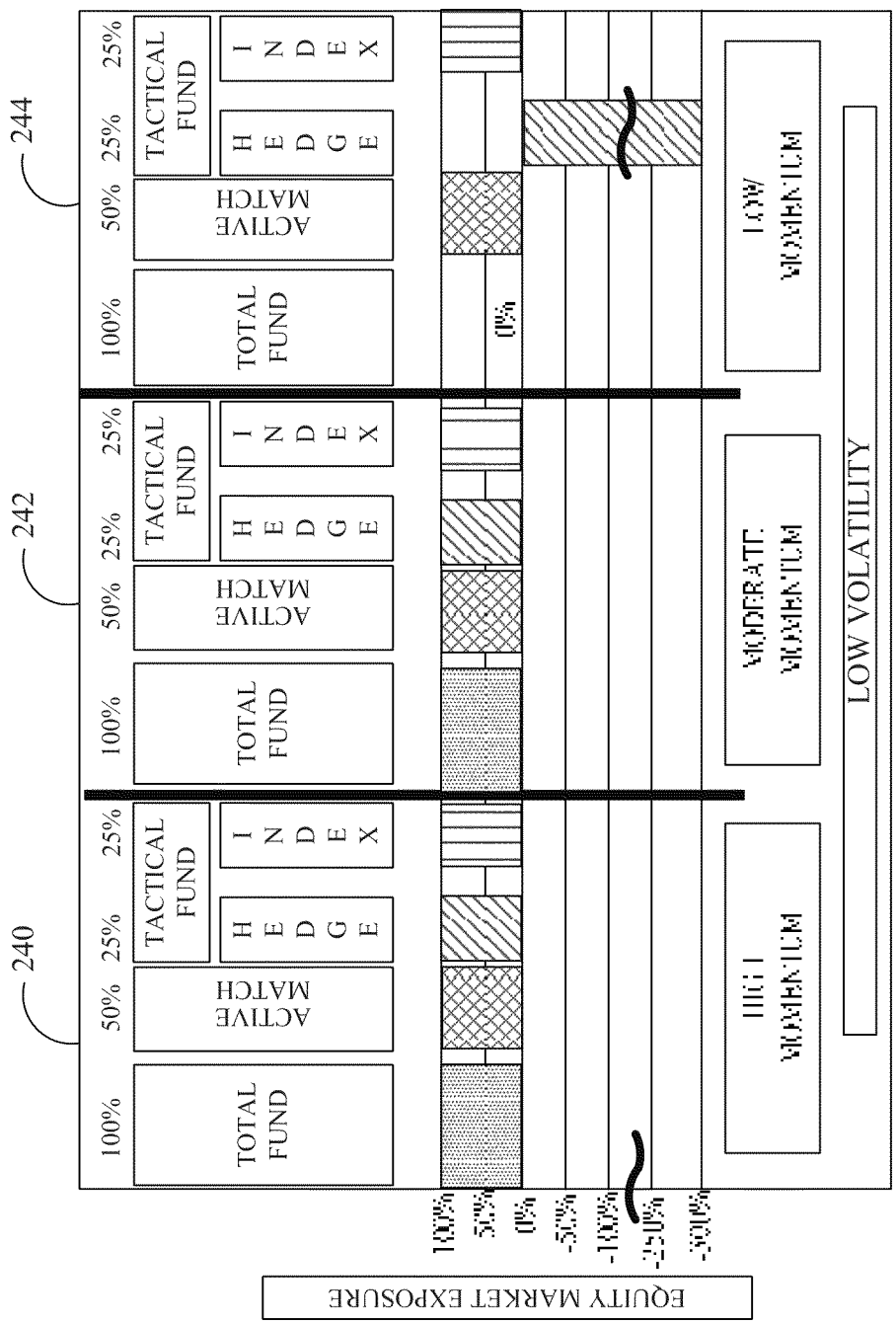
FIGS. 8a and 8b illustrate charts representing an allocation of assets between a passively-managed index fund portion and a tactical manager fund portion according to embodiments of the method for managing a financial portfolio during period of relatively low market volatility and relatively high market volatility, respectively.

FIG. 8a illustrates a chart representing the allocation of assets according to one embodiment of the method for managing a financial portfolio relative to market stability. FIG. 8a illustrates the techniques for managing risk in periods of low volatility and includes a strategy for low volatility periods where momentum is high 240, moderate 242 and low 244. With reference to FIGS. 5, 6a, 6b, 7a, 7b, and 7c, the tactical funds (hedge and index funds) represent the tools used to increase or decrease equity exposure. As illustrated in FIG. 8a, a period of low volatility and low momentum may decrease the amount of assets in the tactical manager fund.

Figure 8B:
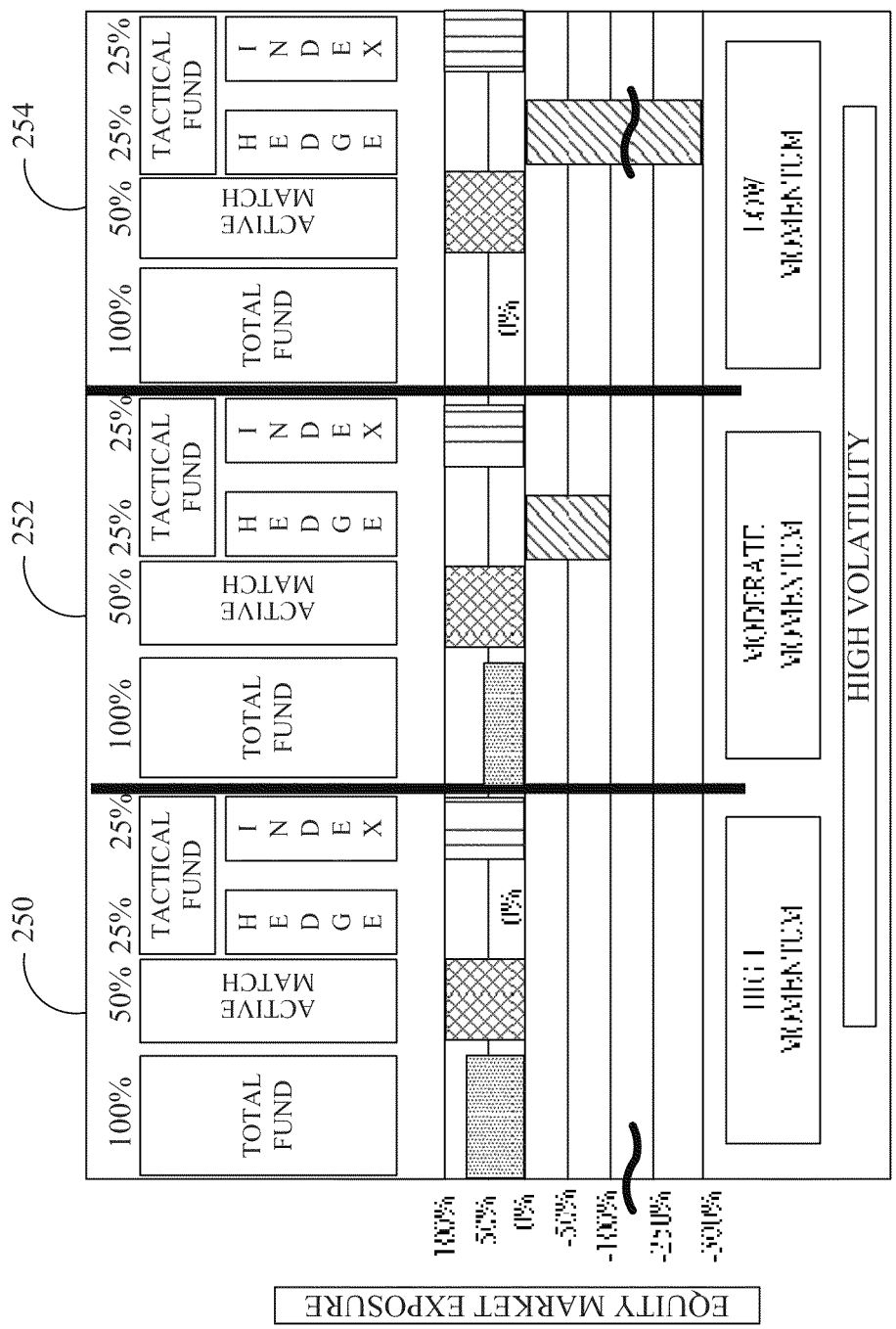

FIG. 8b illustrates a chart representing the allocation of assets according to one embodiment of the method for managing a financial portfolio relative to market stability. FIG. 8b illustrates the techniques for managing risk in periods of high volatility and includes a strategy for high volatility periods where momentum is high 250, moderate 252 and low 254. With to FIGS. 5, 6a, 6b, 7a, 7b, and 7c, the tactical funds (hedge and index funds) represent the tools used to increase or decrease equity exposure. As illustrated in FIG. 8b, a period of high volatility and high momentum 250 may result in a reduction of the allocation of assets in the tactical fund. In addition, a period of high volatility and moderate momentum 252 may result in a reduction of the allocation of assets in the total fund and an increase the tactical fund. FIG. 8b further illustrates that a period of high volatility and low momentum 254 may result in a decreased allocation of assets in the total fund and an increase in the amount of assets in the tactical fund.

With reference back to FIG. 5, if there is a determination of low risk, the next step, step 180, determines if the momentum value is high. If momentum is high, the equity exposure strategy A, step 192, may be implemented, block 240 of FIG. 8a. If momentum is not high, the next step, step 182, determines if the momentum value is low. If the momentum is low, then the equity exposure strategy B may be implemented, step 194, block 244 of FIG. 8a. If momentum is not low, then momentum is moderate, step 188, and equity exposure strategy C may be implemented, step 196, block 242 of FIG. 8a.

If the risk indicator is high, the next step, step 178 determines the momentum associated with the high risk indicator value. The next step, step 186, determines if the momentum value is high. If momentum is high, the equity exposure strategy F, step 202 may be implemented, block 250 of FIG. 8b. If momentum is not high, the next step, step 184, determines if the momentum value is low. If the momentum is low, then the equity exposure strategy E may be implemented, step 200, block 254 of FIG. 8b. If momentum is not low, then momentum is moderate, step 190, and equity exposure strategy D may be implemented, step 198, block 252 of FIG. 8b.

Figure 6A:
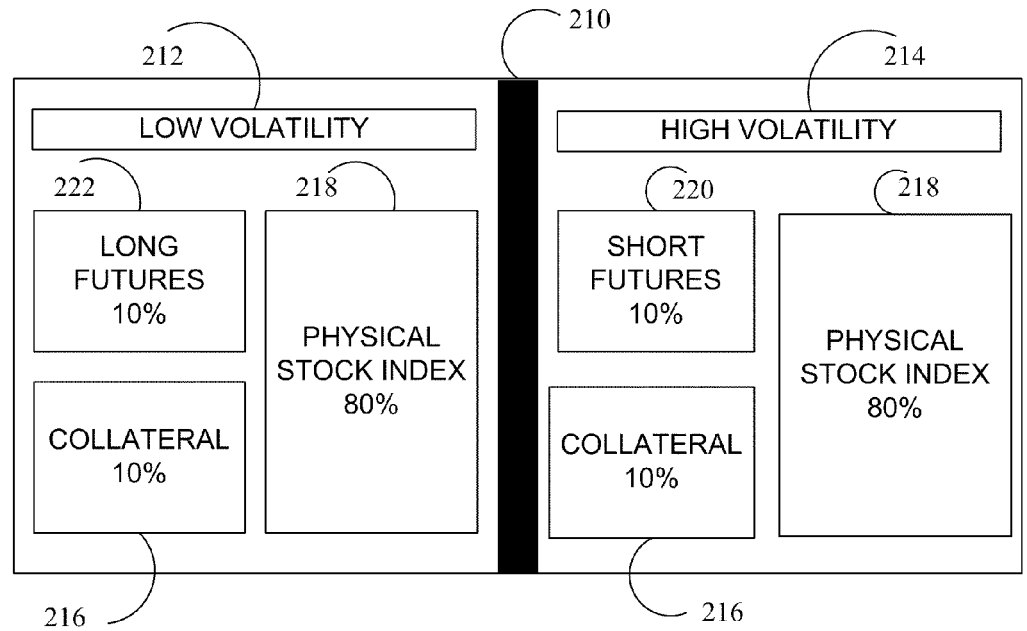
FIGS. 6a and 6b illustrate charts representing allocations of assets according to embodiments of the methods for managing a financial portfolio relative to market volatility.

FIG. 6a illustrates a chart representing the allocation of assets according to one embodiment of the method for managing a financial portfolio relative to market stability. The chart 210 of FIG. 6 includes a low volatility side 212 and a high volatility side 214. On the low volatility side 212, one embodiment of allocating assets includes 80% of assets allocated to a physical stock index investment 218, 10% of assets allocated to a collateral investment 216, and 10% of assets allocated to a long futures investment 222. On the high volatility side 214, one embodiment of allocating assets includes 80% of assets allocated to a stock index investment 218, 10% of assets allocated to a collateral investment 216, and 10% of assets allocated to a short futures investment 220. The chart of FIG. 6a illustrates the novel use of futures to increase and decrease equity exposure because in times of high or low volatility, the 80% of assets in the stock index investment does not require modification, the modification during periods of increasing or decreasing volatility may only require a modification to the futures positions in the portfolio. It may be further understood that the long position depicted on the low volatility side 212 includes fully equitized long futures resulting in 90% equity exposure while the high volatility side 214 may neutralize or hedge the equity resulting in 0% equity exposure. As will be understood by one of skill in the art, collateral may include currency, cash, properties assets, or a combination thereof.

Figure 6B:
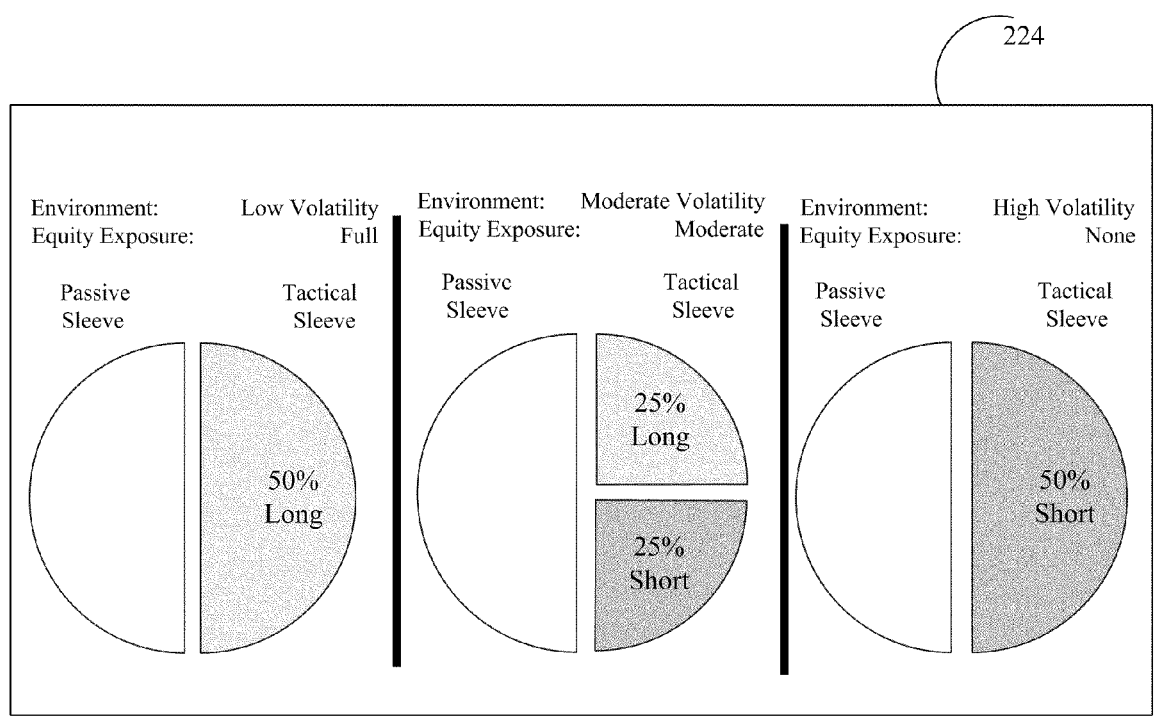

The percentages shown in FIG. 6a as allocated to each type of investment (i.e. futures, collateral, and index) may be modified or adjusted without departing from the general nature of the novel techniques for managing a portfolio. For example, FIG. 6b illustrates a chart 224 representing the allocation of assets according to another embodiment of the invention which includes a low volatility state with full equity exposure and a 100% long position on the tactical fund, a modest volatility state with a 50%/50% split between long and short positions in the tactical fund, and a high volatility state with no equity exposure and a 100% short position on the tactical fund.

FIG. 7a illustrates a chart representing the adjustment of equity exposure according to one embodiment of the method for managing a financial portfolio relative to market volatility. As illustrated by the chart 230, an optimized system and method for managing risk may proportionally decrease the percentage of equity exposure relative to volatility levels. FIG. 7b also illustrates a chart representing the adjustment of equity exposure according to one embodiment of the method for managing a financial portfolio relative to market volatility. As illustrated in chart 232, the risk value trigger may include a number. In one embodiment, the number may comprise the value of an index indicating risk, or volatility measurement value. In other embodiments, the risk value trigger may be a combination of a volatility measurement value, momentum value and other criteria. FIG. 7c shows, via bar chart, another set of equity exposure percentages to be achieved by the computer system based on market volatility reaching certain predetermined threshold values.

In addition, values for the risk value triggers may be different for each portfolio and may be modified from time to time. The trigger values may also be derived from investment guidelines set by the trust entity 150 of FIG. 3.

Figure 9A:
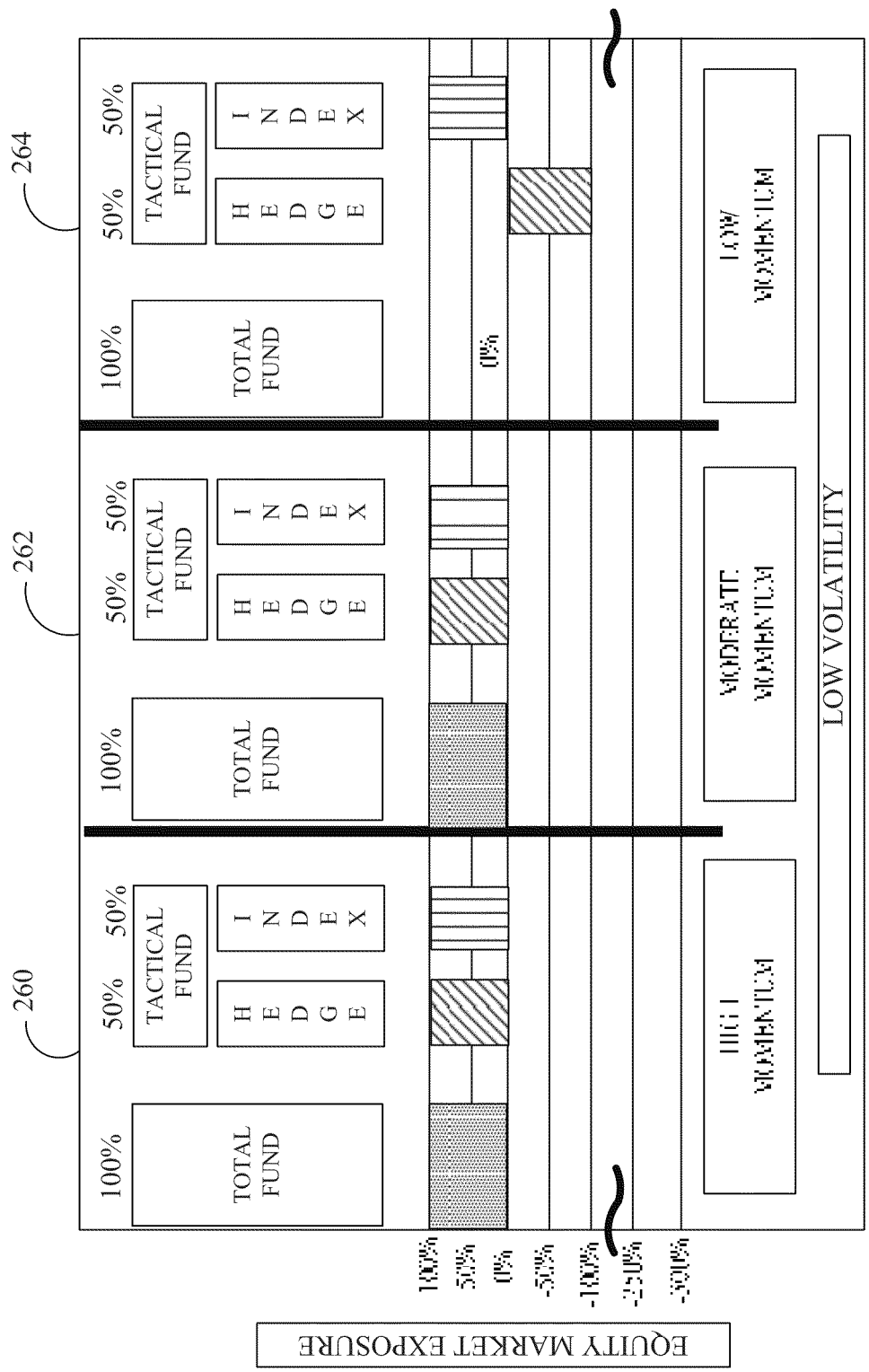
FIGS. 9a and 9b illustrate charts representing an allocation of assets in a tactical manager fund according to other embodiments of the methods for managing a financial portfolio during periods of relatively low market volatility and relatively high market volatility, respectively.
Figure 9B:
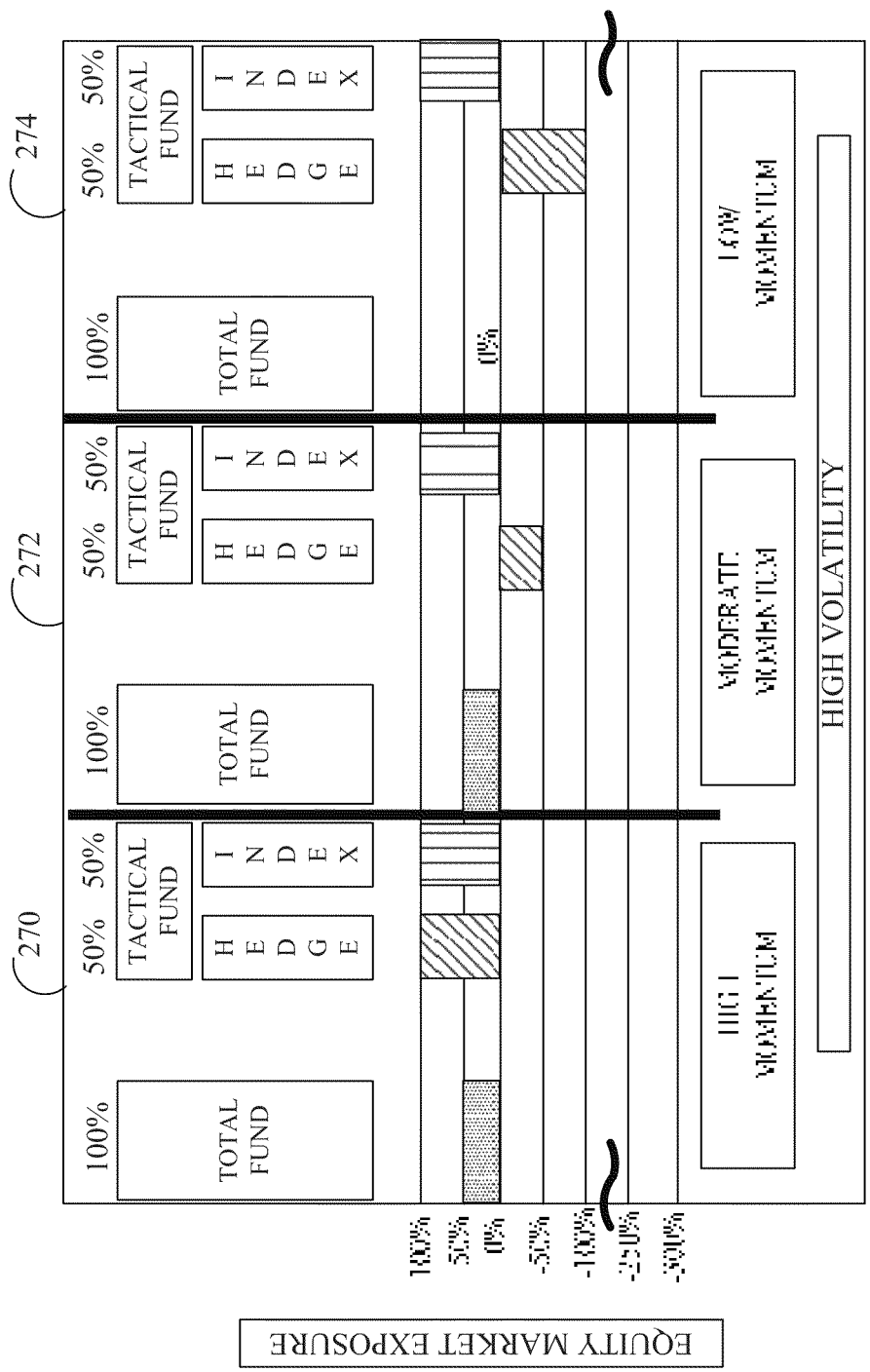

FIGS. 9a-9b illustrate charts representing the allocation of assets according to other embodiments of the method for managing a financial portfolio relative to market stability in which only the tactical hedge funds are employed and there is no matching fund investing in equities. FIG. 9a illustrates the techniques for managing risk in periods of low volatility and includes a strategy for low volatility periods where momentum is high 260, moderate 262 and low 264. With reference to FIGS. 5, 6, 7a, and 7b, the tactical funds (hedge and index funds) represent the tools used to increase or decrease equity exposure. As illustrated in FIG. 9a, a period of low volatility and low momentum may decrease the amount of assets in the tactical manager fund.

FIG. 9b illustrates the techniques for managing risk in periods of high volatility and includes a strategy for high volatility periods where momentum is high 270, moderate 272 and low 274. With respect to FIGS. 5, 6, 7a, and 7b, the tactical manager funds (hedge and index funds) represent the tools used to increase or decrease equity exposure. As illustrated in FIG. 9b, a period of high volatility and high momentum 270 may result in a reduction of the allocation of assets in the tactical hedge fund. In addition, a period of high volatility and moderate momentum 272 may result in a reduction of the allocation of assets in the total fund and an increase the hedge fund. FIG. 9b further illustrates that a period of high volatility and low momentum 274 may result in a decreased allocation of assets in the total fund and an increase in the amount of assets in the hedge fund.

Applications for Use of Invention

One specific, exemplary use of the systems and methods of the present invention to manage and reduce risk in financial portfolios is to protect investment account values derived from investments and other financial assets held in advisory, retirement, institutional, endowment, foundation and other account types for use in providing financial resources for designated purposes. Assets in such accounts are invested in financial instruments which are intended to increase in value over time in order to provide additional resources for dedicated purposes, including retirement cash flow, resources for institutional or individual use, or other uses. Proper management of the investments and other financial assets held in such accounts is important to insure that assets are available for the designated purposes.

As used to protect account values, and referring back to FIG. 1, the investor 101 is the account holder, the investment manager 103 may be the investment manager retained by or working on behalf of the account holder, and the investment account may be the advisory, retirement, institutional, endowment, foundation or other account type as described above. In one embodiment, the investment account may accumulate a set of contributions to the account from the account holder, for example, an individual or an institution. As illustrated in FIG. 1, the investment account may include a set of funds: Fund A 113, Fund B 111, Fund C 107 and Fund D 125, all as described above.

Another exemplary use of the systems and methods of the present invention to manage and reduce risk in financial portfolios is to protect the account values of portfolios which are used in making guaranteed payments such as those provided for in annuities. Annuities, like life insurance and certain other financial and insurance products, provide for the payment by one party at one time and the benefits of payouts at a later point in time. Many annuities include one or more guaranteed payouts at future dates, financed by investing premiums in various investment assets in a "separate account" such as equities, bonds, and cash. Proper management of the financial assets underlying the investments is important to insure that the account values are properly maintained to meet desired targets.

In normal operations, premiums or other payments are received, collected in various accounts and actively managed in one or more portfolios. The computer system of the present invention may be used to manage the funds in the separate account, as described in detail above, to thereby hedge against undue market volatility. In this way, the annuity provider can better ensure the accounts from which payments are made to annuitants are maintain their value.

As used to help fund annuity account values, and referring back to FIG. 1, the investor 101 is the annuitant, the investment manager 103 may be the annuity provider or an investment manager retained by or working on behalf of the annuity provider, and the investment account may be the separate account as described above.

The annuitant may include an individual or group of individuals that purchase an annuity from the annuity provider, wherein the annuity provider receives contributions from the annuitant and deposits the contributions into the separate account. The annuity provider may include an insurance company or similar institution. In one embodiment, the annuity provider includes or is affiliated with a financial institution, for example, an asset management firm or investment company.

The separate account may also accumulate a set of contributions from a plurality of annuitants, for example, a plurality of employees at a company or even a plurality of companies, and also include a plurality of sub-accounts. The separate account may be organized as a unit investment trust, a type of investment company, and may be registered with the SEC under the 1940 Act. As illustrated in FIG. 1, the separate account may include a set of funds; Fund A 113, Fund B 111, Fund C 107 and Fund D 125, all as described above.

In one embodiment, the annuity provider or other entity responsible for the separate account may also (1) add new investment funds (or sub-divisions of investment funds) to, or remove investment funds (or sub-divisions of investment funds) from, the separate account, (2) combine any two or more investment funds or sub-divisions thereof, (3) transfer assets determined by the annuity provider to be the proportionate share of the class to which the contracts belong from any of the investment funds to another investment fund by withdrawing the same percentage of each investment in that investment fund with appropriate adjustments to avoid odd lots and fractions, (4) operate the separate account or any investment fund as a management investment company, including a form that allows the annuity provider to make direct investments, (5) deregister the separate account from being under the purview of the 1940 Act, (6) cause one or more investment funds to invest in a mutual fund. In any event, the funds in the separate account may be managed in accordance with the methodologies and systems of the present invention, as described above.

In one embodiment, contributions received and deposited in the separate account may include assets received from a plurality of financial contracts, including annuities contracts or similar investment vehicles. The deposited assets may be allocated to the separate account or sub-accounts where an annuitant may participate in the investment of the assets in proportion to the amounts they have contributed. The annuity provider may retain in the separate account assets that are in excess of the reserves and other liabilities relating to the annuities contracts or to other contracts, certificates or agreements, or may transfer them to a general account.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

FIGS. 1 through 9 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A computerized method for managing a financial portfolio relative to market stability, the method comprising:
   determining a first allocation of assets in the portfolio and a level of equity exposure, the portfolio including one or more funds;
   monitoring a quantitative risk indicator for market signals, the market signals including data transmissions to a computer;
   the computer determining with a processor whether the quantitative risk indicator meets a predetermined risk threshold value by comparing data transmission values of the market signals on the computer readable medium associated with the computer with data representing the predetermined risk threshold value; and
   automatically adjusting the level of equity exposure in response to determining that the risk indicator meets the risk threshold value and based on a momentum factor, by changing a position on a derivative instrument which is based on one or more equities held in the portfolio,
   wherein the momentum factor is at least indicative of a historical empirical distribution of changes in a securities market index and corresponds to a momentum mode of a plurality of predetermined momentum modes.

2. The method of claim 1, wherein the step of monitoring the quantitative risk indicator for market signals includes monitoring a volatility indicator that indicates volatility in a financial marketplace.

3. The method of claim 1, wherein adjusting the allocation of assets includes recalculating the allocation of assets relative to a predetermined percentage of the associated level of equity exposure.

4. The method of claim 1, wherein the step of changing includes selling a position on a first futures contract.

5. The method of claim 4, wherein the step of changing further includes purchasing a short position on a second futures contract.

6. The method of claim 4, wherein the step of changing includes selling a short position on the first futures contract.

7. The method of claim 1, further comprising:
assigning a risk indicator trigger value;
determining a volatility mode on the basis of a current risk indicator value relative to a risk indicator trigger value;
determining the momentum mode on the basis of a current momentum indicator value relative to a momentum trigger value;
implementing an equity exposure strategy based on the volatility mode and momentum mode.

8. The method of claim 7, wherein the step of implementing an equity exposure strategy based on the volatility mode and the momentum mode, further comprises:
decreasing assets allocated in a first fund;
increasing assets allocated to a second fund; and
maintaining a minimum level of liquidity in at least one or more funds.

9. A computer implemented method for managing a financial portfolio relative to market stability, the method comprising:
storing, on a computer readable medium, a representation of a first allocation of assets in the portfolio and a level of equity exposure, the portfolio including one or more funds;
monitoring a quantitative risk indicator for market signals;
determining with a processor whether the quantitative risk indicator meets a predetermined risk threshold value;
adjusting the level of equity exposure in response to determining that the risk indicator meets the risk threshold value and based on a momentum factor, by changing a position on a derivative instrument which is based on one or more equities held in the financial portfolio; and
storing, on the computer readable medium, an adjusted representation of the level of equity,
wherein the momentum factor is at least indicative of a historical empirical distribution of changes in a securities market index and corresponds to a momentum mode of a plurality of predetermined momentum modes.

10. A computerized method for managing a financial portfolio relative to market volatility, the method comprising:
pooling one or more contributions associated with one or more financial contracts into an account;
associating the contributions in the account with one or more funds to create a portfolio of securities;
monitoring a quantitative risk indicator for market signals relating to the portfolio of securities, the market signals including data transmissions to a computer;
determining with a processor whether the quantitative risk indicator meets a predetermined risk threshold value by comparing data transmission values on a computer readable medium associated with the computer with data representing the predetermined risk threshold value; and
adjusting the level of equity exposure for the portfolio by changing a position in a given fund in response to determining that the risk indicator meets the risk threshold value and based on a momentum factor,
wherein the momentum factor is at least indicative of a historical empirical distribution of changes in a securities market index and corresponds to a momentum mode of a plurality of predetermined momentum modes.

11. The method of claim 10 wherein the step of associating the contributions in the account with one or more funds includes a matched fund, a tactical manager fund and an index fund.

12. The method of claim 11 wherein the matched fund comprises a fund investing in the underlying securities in the portfolio of securities.

13. The method of claim 11 wherein the tactical manager fund comprises a set of futures and options contracts relating to the portfolio of securities.

14. The method of claim 11 wherein the index fund comprises an index fund relating to the portfolio of securities.

15. The method of claim 11 wherein the step of adjusting the level of equity exposure for the portfolio by changing a position in a given fund includes changing a position in the tactical manager hedge fund.

16. The method of claim 11 wherein the step of adjusting the level of equity exposure for the portfolio by changing a position in a given fund includes changing a position in the tactical manager fund and the index fund.

17. The method of claim 11 wherein the step of adjusting the level of equity exposure for the portfolio by changing a position in a given fund includes:
changing a position in the tactical manager hedge fund and the index fund; and
maintaining a position in the matched fund.

18. The method of claim 10 wherein the one or more financial contracts comprise one or more annuity contracts.

19. The method of claim 18 further including:
distributing a set of guaranteed payments to one or more annuitants based on a contribution amount and an annuity type.

20. The method of claim 1, wherein the plurality of predetermined momentum modes includes a high momentum mode, a low momentum mode, and a moderate momentum mode.

* * * * *